[15] 3,676,541
Nishi et al.
[45] July 11, 1972

[54] CENTRIFUGAL CASTING METHOD
[72] Inventors: Seiya Nishi; Akira Oshio, both of Tokyo; Kiyomitsu Eto, Kawaguchi, all of Japan
[73] Assignees: Onoda Cement Company Limited, Onoda-shi, Yamaguchi; Nippon Concrete Industries Company, Limited, Tokyo, Japan
[22] Filed: Sept. 8, 1970
[21] Appl. No.: 70,599

[30] Foreign Application Priority Data
Sept. 9, 1969 Japan..................................44/71016

[52] U.S. Cl..................................264/234, 106/90, 106/95, 106/314, 106/315, 264/311
[51] Int. Cl.......................................................B29c 25/00
[58] Field of Search..............106/90, 95, 314, 315; 264/234, 264/311

[56] References Cited

UNITED STATES PATENTS 3,465,825  9/1969  Hook et al. ..............................106/90
3,277,162  10/1966  Johnson..................................106/90
2,690,975  10/1954  Scripture..............................106/315
2,499,445  3/1950  Ammann..............................106/315
2,141,571  12/1938  Kennedy et al. .........................106/90
2,141,569  12/1938  Tucker...................................106/90
1,972,208  9/1934  Tucker...................................106/90

OTHER PUBLICATIONS

Taylor, W. H., "Concrete Technology and Practice," American Elsevier, pgs. 339–340 (1965).

Primary Examiner—Tobias E. Levow
Assistant Examiner—W. T. Scott
Attorney—Fidelman, Wolffe & Leitner

[57] ABSTRACT

This invention relates to a method of making mortar or concrete pipes by centrifugal casting. The method is characterized by using mortar or concrete prepared from a cementiteous material incorporated with a salt of $\beta$-naphthalenesulfonic acid-formaldehyde condensate, and curing the mortar or concrete pipes made by the above condition with high pressure steam in an autoclave.

16 Claims, No Drawings

CENTRIFUGAL CASTING METHOD

This invention relates to a method of making mortar or concrete pipes, such as piles, poles or Hume pipes, by centrifugal casting.

On making green mortar or concrete pipes by centrifugal casting process, a small amount of cement, sand and impalpable powder additives are brought to the inside surface of a cast pipe by water segregated out of mortar or concrete during casting. As the result a separate layer of slurry is formed. For instance, although use of fine silica, fly ash or blast furnace slag as an impalpable miscible material brings about such advantages that the water-impermeability of the mortar or concrete pipe is enhanced, the production cost is reduced and the increment in mechanical strength by autoclave curing is increased, it promotes the formation of a layer of segregated slurry on the inside wall of the pipe and the formed layer gradually deforms eventually to give a very uneven inside surface for the inside wall of the pipe when the revolution of the casting machine was stopped. The formation of such a layer of segregated slurry is undesirable because it causes not only lowering of the strength of the product but also increase in frictional resistance against pass of a liquid through the product pipes.

It is an object of the present invention to provide a method of making well consolidated mortar or concrete pipes without formation of such a layer of segregated slurry on the inside wall of pipes.

Another object is to obtain mortar or concrete pipes having higher strength.

It has now been discovered that these objects are attained by use of a mortar or concrete added a water reducing agent comprising a salt of $\beta$-naphthalenesulfonic acid (hereinafter referred to as "$\beta$-NS")-formaldehyde condensate represented by the formula

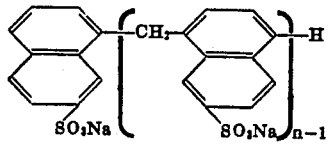

where $n$ is a number of greater than 2.

to Portland cement or a mixture of Portland cement and an impalpable miscible material such as fine silica, fly ash, blast furnace slag or the like (these cements will hereinafter be referred to as "cementiteous materials"). The mortar or concrete thus prepared is formed into a pipe by centrifugal casting and subjected it to high pressure steam curing or to steam curing and then after remolding, to high pressure steam curing in an autoclave. It has also been found that the necessary amount of the above condensate added to cementiteous materials can be reduced by using the above condensate in combination with a water reducing agent such as carboxylic acids and hydroxy carboxylic acids. The term "water reducing agent" used in this specification means an agent which reduces the necessary amount of water to form a concrete or mortar of desired workability.

In our experiments, mortar pipes were cast with mortars having flow values of 170 – 180 mm. The mortars were prepared by mixing a mixture of normal Portland cement and fine silica in an amount of 40 percent of the total weight (Blaine value 3750 cm$^2$/g, specific gravity 2.68) with river sand and adding to the mixture as a water reducing agent a sodium salt of $\beta$-NS-formaldehyde condensate containing at least 5$\beta$-NS units in a molecule, Maginon 100 supplied by Sugai Chemical Industry Co., Ltd. of which the main ingredient is calcium alkylaryl-sulfonate, Pozzolith No. 5L supplied by Nisso-Masterbuilders Co., Ltd. of which the main ingredient is calcium lignin-sulfonate or mixture of such a water reducing agent with either Plastiment supplied by Nippon Sika K.K. of which the main ingredient is a sodium salt of adipic acid derivatives or calcium lactate in an aqueous solution in the amounts as listed in the Table 1. Fourteen kgs of the mortar was cast in a spinning machine to make a pipe (outer diameter 20 cm, inner diameter 12 cm, length 30 cm) while revolving the machine at an initial speed of 150 rpm for 1.5 minutes, at an intermediate speed of 300 rpm for 1.5 minutes and a final speed of 550 rpm for 4 minutes and the thickness of a layer of segregated slurry in the inside wall of the pipe was determined. The results were summarized in the Table 1. In these experiments there was used sand of the Kinu-gawa river (maximum grain size 5 mm, FM = 3.1).

TABLE 1

| Water reducing agent | Amounts added (percent) | Water reducing agent | Amounts added (percent) | Flow (mm.) | Water/cement ratio (w/c)1 immediately after mixing | Water/cement ratio (w/c)2 after consolidation | Diminution in percentage of water/cement ratio (w/c)1−(w/c)2 | Diminution in percentage of water/cement ratio $\frac{(w/c)1-(w/c)2}{(w/c)1}$ | Thickness of layer of segregated slurry (mm.) |
|---|---|---|---|---|---|---|---|---|---|
| Plain mortar | | | | 170 | 0.383 | 0.343 | 0.104 | | 7-9 |
| H | 0.25 | | | 170 | 0.347 | 0.341 | 0.017 | | 8-10 |
| H | 0.50 | | | 178 | 0.335 | 0.324 | 0.033 | | 7-9 |
| H | 0.75 | | | 179 | 0.320 | 0.265 | 0.171 | | 0 |
| | | A | 0.03 | 180 | 0.383 | 0.345 | 0.105 | | 8-10 |
| | | A | 0.06 | 175 | 0.368 | 0.325 | 0.117 | | 8-10 |
| | | A | 0.12 | 180 | 0.349 | 0.303 | 0.132 | | 6-7 |
| | | N | 0.03 | 180 | 0.380 | 0.340 | 0.105 | | 8-10 |
| | | N | 0.06 | 175 | 0.383 | 0.342 | 0.110 | | 8-10 |
| | | N | 0.12 | 170 | 0.388 | 0.342 | 0.119 | | 8-10 |
| H | 0.50 | A | 0.03 | 180 | 0.352 | 0.296 | 0.159 | | 0 |
| H | 0.50 | N | 0.06 | 180 | 0.349 | 0.262 | 0.250 | | 0 |

Note:
H: Sodium salt of $\beta$-NS-formaldehyde condensate containing 5 or more $\beta$-NS units in a molecule.
A: Plastiment.
N: Calcium lactate (extra pure reagent).

The above Table 1 indicates that in case of the plain mortar containing fine silica, the segregation of an impalpable miscible material is of a high degree, in case where a sodium salt of $\beta$-NS-formaldehyde condensate alone is added, the segregation of an impalpable miscible material decreases in proportion of increase in the amount added and come nearer to zero in the amount of 0.75 percent, in cases where either Plastiment or calcium lactate alone is added, the segregation of an impalpable miscible material is reduced little in proportion of increase in the amount added, and when the sodium salt of $\beta$-NS-formaldehyde condensate is used in combination with the Plastiment or calcium lactate the segregation of an impalpable miscible material is reduced to zero in a smaller amount of the former.

The present invention bases itself on the above discoveries and resides in a method of making mortar or concrete pipes by centrifugal casting which is characterized by adding a salt of $\beta$-NS-formaldehyde condensate containing 5 or more $\beta$-NS units in a molecule either alone or in combination with a carboxylic acids, hydroxy carboxylic acids, their derivatives, alkali or alkaline earth metal salts thereof to mortar or concrete consisting of cementiteous materials.

The cementiteous materials used in the present invention include normal Portland cement, high early strength Portland cement, blast furnace slag cement, silica cement and fly ash cement and mixtures of such cements with impalpable miscible materials such as fine silica, fly ash, blast furnace slag or the like.

As the salt of β-NS-formaldehyde condensate preferably used in the practice of the present invention are sodium-, calcium- and their mixed salts of β-NS-formaldehyde condensates containing at least 70 percent of condensation polymers having 5 to 10 β-NS units in a molecule. The carboxylic acids and hydroxy carboxylic acid suitably used comprise lactic acid, gluconic acid, adipic acid, succinic acid, maleic acid, heptanoic acid, and their derivatives, alkali and alkaline earth metal salts thereof, and mixtures thereof are also used.

The salt of β-NS-formaldehyde condensate may be added in the amount of 0.75 to 1.5, preferably 0.8 to 1.2 percent by weight of cementiteous materials when used alone, and in the amount of 0.2 to 1.5, preferably 0.4 to 1.2 percent weight of cementiteous materials when used in combination of the carboxylic acids, hydroxylic carboxylic acids, their derivatives, alkali or alkaline earth metal salts thereof or mixture thereof which may be used in the amount of 0.03 to 0.2, preferably 0.06 to 0.15 percent by weight of cementiteous materials.

According to the present invention the segregation of slurry comprising cement and an impalpable miscible material during pipe casting is avoided and, thereby, well-consolidated mortar or concrete pipes are manufactured in a simple way at a moderate cost.

EXAMPLE 1

Concretes were prepared by adding coarse aggregate and fine aggregate in the amounts as listed in the Table 2 to 600 Kg/m³ of a cementiteous material (mixture of 450 Kg/m³ of normal Portland cement and 150 Kg/m³ of fine silica of Blaine value of 3,800 cm²/g) and then a sodium salt of β-NS-formaldehyde condensate (5 to 10 β-NS units in a molecule), Plastiment and water in the amounts as listed in the Table 2. The concretes thus obtained were cast into pipes by means of the spinning machine as used in the above experiments on the manufacture of mortar pipes under the same conditions as in the above experiments. The results were summarized in the Table 2.

Note:

Symbol H and A have the same meanings as in the Table 1.

The above Table 2 indicates that according to the present invention concrete pipes are obtained without or with little formation of a layer of segregated layer in the inside wall of a pipe.

EXAMPLE 2

Concretes were prepared by adding coarse aggregate and fine aggregate in the amounts as listed in Table 3 to 500 kg/cm³ of a cementiteous material (mixture of 450 kg/m³ of normal Portland cement and 50 kg/cm³ of fly ash of Blaine value of 3100 cm²/g) and then a sodium or calcium salt of β-NS-formaldehyde condensate (5~10β-NS units in a molecule) (H) or (H′), Plastiment (A), calcium lactate (L), sodium succinate (S), sodium gluconate (G), sodium maleate (M) and water in the amounts as listed in the Table 3. The concretes thus obtained were cast in a spinning machine to make pipes while revolving the machine at an initial speed of 100 rpm for 1.5 minutes, at an intermediate speed of 310 rpm for 1.5 minutes and a final speed of 380 rpm for 4 minutes, and green concrete pipes (outer diameter 30cm, inner diameter 18cm, length 10cm) were made. The thickness of a layer of segregated slurry in the inside wall of the pipes was shown in Table 3.

The green concrete pipes thus obtained were cured at 180° C for 5 hrs in an autoclave. After curing, compressive strength of pipes was determined. The results obtained were summarized in Table 3.

TABLE 3

| Water reducing agent | Amounts added (percent) | Water reducing agent | Amounts added (percent) | Unit water content (kg./m.³) | Unit aggregate content (kg./m.³) Below 5 mm. | Unit aggregate content (kg./m.³) 5-20 mm. | Slump (cm.) | Water/cement ratio (w/c) immediately after mixing | Layer of segregated slurry (mm.) | Compressive strength after autoclave curing (kg./cm.²) |
|---|---|---|---|---|---|---|---|---|---|---|
| H | 0.5 | | | 60 | 730 | 1090 | 7 | 0.331 | 7-10 | 843 |
| H′ | 0.75 | | | 35 | 740 | 1158 | 20 | 0.270 | 0-2 | 1050 |
| H | 0.5 | A | 0.1 | 44 | 740 | 1116 | 7 | 0.288 | 0 | 922 |
| H | 0.5 | L | 0.06 | 40 | 750 | 1117 | 10 | 0.280 | 0 | 904 |
| H′ | 0.5 | S | 0.06 | 38 | 750 | 1121 | 5 | 0.276 | 0 | 900 |
| H | 0.5 | G | 0.15 | 40 | 750 | 1117 | 11 | 0.280 | 2 | 898 |
| H′ | 0.5 | M | 0.15 | 38 | 750 | 1121 | 5 | 0.276 | 2 | 910 |

What is claimed is:

1. In a method of making cementitious pipe by centrifugal casting, the improvement which comprises adding a salt of a β-napthalenesulfonic acid-formaldehyde condensate in an amount from 0.75 to 1.5 percent by weight based on the cementitious material, to the cementitious material prior to casting.

2. The method of claim 1 wherein said salt is selected from the group consisting of sodium and calcium salts.

3. The method of claim 1 wherein said condensate comprises at least 70 percent condensation polymers having at least five β-naphthalenesulfonic acid units in a molecule.

TABLE 2

| Water reducing agent | Amounts added (percent) | Water reducing agent | Amounts added (percent) | Unit water content (kg./m.³) | Unit aggregate content (kg./m.³) Below 5 mm. | Unit aggregate content (kg./m.³) 5-20 mm. | Slump (cm.) | Water/cement ratio (w/c)1 immediately after mixing | Water/cement ratio (w/c)2 after consolidation | Diminution in percentage of water cement ratio (w/c)1−(w/c)2 / (w/c)1 | Thickness of layer of segregated slurry (mm.) |
|---|---|---|---|---|---|---|---|---|---|---|---|
| Plain concrete | | | | 213 | 598 | 1,024 | 6 | 0.355 | 0.332 | 0.065 | 7-10 |
| H | 0.50 | | | 203 | 601 | 1,037 | 7 | 0.334 | 0.334 | 0.065 | 7-9 |
| H | 0.75 | | | 162 | 618 | 1,098 | 20 | 0.270 | 0.227 | 0.159 | 2 |
| H | 0.50 | A | 0.1 | 193 | 614 | 1,051 | 7 | 0.322 | 0.273 | 0.152 | 0 |

4. The method of claim 1 wherein said salt is present in an amount of from 0.8 to 1.2 by weight based on the cementitious material.

5. The method of claim 1 wherein said cementitious material is selected from the group consisting of Portland cement and mixtures of Portland cement and a material selected from the group consisting of fine silica, fly ash, and blast furnace slag.

6. The method of claim 1 wherein said cast pipes are subjected to high pressure steam curing in an autoclave.

7. In a method of making cementitious pipe by centrifugal casting, the improvement which comprises adding from 0.2 to 1.5 percent weight of a salt of a β-naphthalenesulfonic acid-formaldehyde condensate and from 0.03 to 2 percent weight of any member selected from the group consisting of carboxylic acids, hydroxy carboxylic acids, derivatives thereof, and alkali and alkaline earth metal salts thereof, to the cementitious material prior to casting, the weight percent being based on the cementitious material.

8. The method of claim 7 wherein said condensate comprises at least 70 percent condensation polymers having at least five β-naphthalenesulfonic acid units in a molecule.

9. The method of claim 7 wherein said condensate is present in an amount of from 0.4 to 1.2 percent by weight.

10. The method of claim 7 wherein said member is present in an amount from 0.06 to 0.15 percent by weight.

11. The method of claim 10 wherein said condensate is present in an amount of from 0.4 to 1.2 percent by weight.

12. The process of claim 7 wherein said member is selected from the group consisting of lactic acid, gluconic acid, adipic acid, succinic acid, malleic acid, heptanedioic acid, and alkali metal salts, alkaline earth metal salts and derivatives thereof.

13. The method of claim 12 wherein said condensate comprises at least 70 percent condensation polymers having at least five β-napthalenesulfonic acid units.

14. The method of claim 13 wherein the member is a sodium salt of an adipic acid derivative.

15. The method of claim 13 wherein the member is calcium lactate.

16. The method of claim 7 wherein the cast pipes are subjected to high pressure steam curing in an autoclave.

* * * * *